Figure 1:
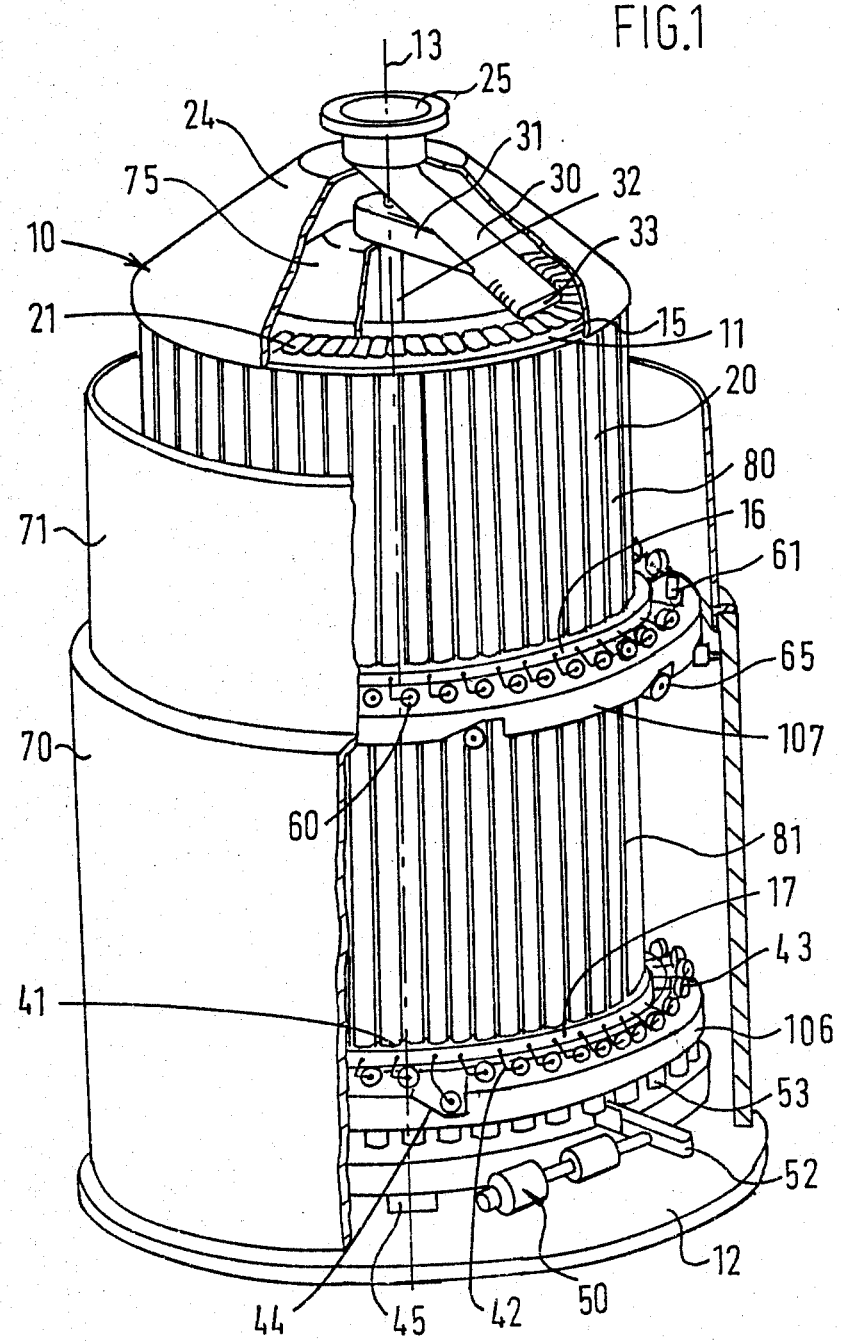

United States Patent [19]

Pointon et al.

[11] Patent Number: 4,626,104

[45] Date of Patent: Dec. 2, 1986

[54] METHOD AND APPARATUS FOR MIXING PARTICULATE MATERIALS

[75] Inventors: Ronald H. Pointon, Formby; Allen F. Nightingale, Sutton Coldfield, both of England

[73] Assignee: W & A Bates Limited, England

[21] Appl. No.: 671,242

[22] Filed: Nov. 14, 1984

[30] Foreign Application Priority Data

Nov. 24, 1983 [GB] United Kingdom ............... 8331422

[51] Int. Cl.⁴ .................. G05D 11/00; B01F 15/04
[52] U.S. Cl. .................................... 366/162; 366/16; 366/134; 414/267; 414/272
[58] Field of Search .............. 366/134, 160, 162, 18, 366/19, 16, 17, 20, 21; 222/330, 432, 450, 436; 414/272, 267

[56] References Cited

U.S. PATENT DOCUMENTS

| 86,410 | 2/1869 | Johnson | 414/272 |
| 2,848,144 | 8/1958 | Haskell | 222/330 |
| 3,467,151 | 9/1969 | Vogt | 222/450 |
| 3,588,054 | 6/1971 | Herman | 366/69 |
| 4,034,847 | 7/1977 | Takagi | 366/162 |

FOREIGN PATENT DOCUMENTS 51-4537 2/1976 Japan.

Primary Examiner—Robert W. Jenkins
Attorney, Agent, or Firm—Stevens, Davis, Miller & Mosher

[57] ABSTRACT

A method and apparatus for blending particulate materials in which a plurality of blending chambers receive, by a series of installments, pre-mixed ingredients so as to ensure that each blending chamber contains an average sample. The blending chambers are then discharged in sequence to provide an output as a series of sub-batches which each comprise the predetermined proportions of ingredients.

11 Claims, 4 Drawing Figures

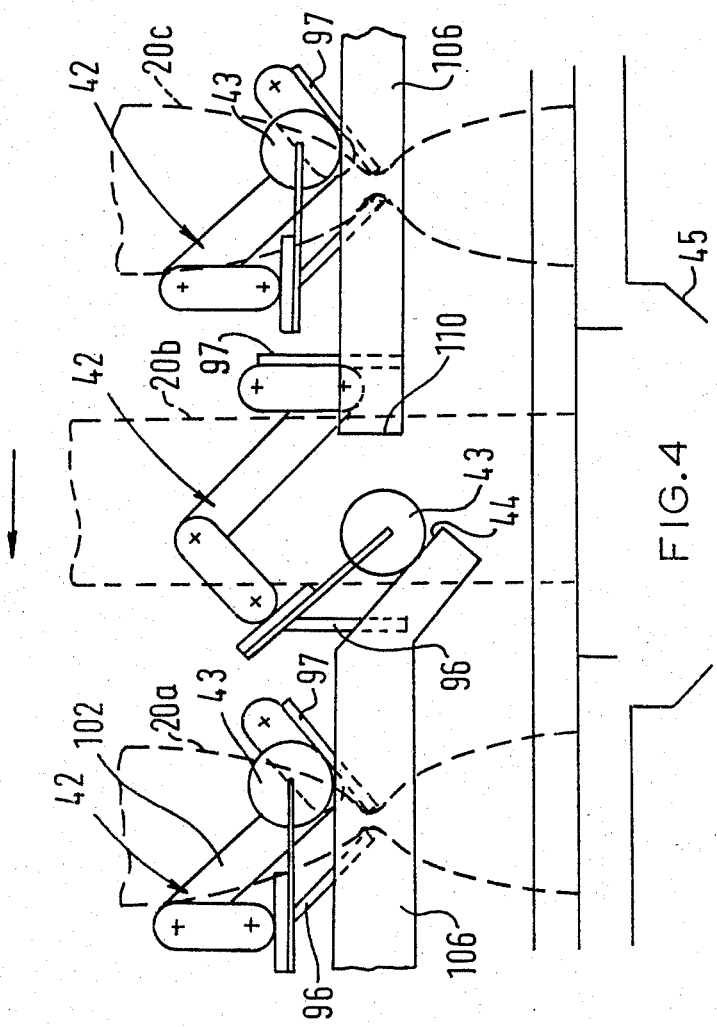

METHOD AND APPARATUS FOR MIXING PARTICULATE MATERIALS

This invention relates to methods and apparatus for mixing particulate materials, and particularly to the mixing of materials having ingredients of differing composition and particle size.

A major problem in continuously mixing together ingredients of different particle size, for example in a manufacturing process where the mixture has to be continuously fed to a subsequent stage, is that when a batch of ingredients is mixed and subsequently poured or otherwise fed into a container the finer particles tend to separate from the larger particles, resulting in a non-uniform feed of ingredients.

This problem is particularly intractable in the manufacture of mixed rubber or other polymer compounds by a continuous mixing process. In this context, a continuous mixing process means one in which pre-mixed polymeric and other ingredients are fed continuously into a masticator which is arranged to work the ingredients together and continuously produce a mixed, fully compounded and masticated polymer output, as opposed to a batch mixing process in which discrete batches of materials are fed into a mixer/masticator and after a predetermined mixing time are removed as discrete batches of mixed and masticated compound.

In order to achieve uniformity of the mixture produced by a continuous mixing process it is essential that a continuous feed of ingredients having precisely determined constituent proportions are fed to the mixer/masticator. It has been found in practice that such uniformity is extremely difficult to achieve with the materials commonly used for the compounding of rubber and other elastomers which, for economic reasons, are supplied in relatively large particles of at least 9 to 12 millimeters, and these are very difficult to pre-mix homogeneously with the fine powders such as carbon black and other compounding ingredients commonly used in the rubber and plastics industries. It has been found that while a pre-mixed batch of polymer and compounding ingredients remains reasonably uniform if it is kept under continuous agitation, as soon as it is attempted to transfer the batch to another vessel the fine ingredients tend to fall through the gaps between the large particles, and the oils, waxes and other sticky ingredients tend to adhere to the walls of any container or passageway which they may contact. As a result, a batch of material delivered from a pre-mixer or blender for the ingredients tends to vary in composition from time to time during the period of its being supplied to the mixer.

The present invention has the object of providing a method and apparatus for alleviating the problems discussed above.

According to the invention, a method of blending particulate materials comprises mixing together predetermined proportions of ingredients and transferring the mixed ingredients by a series of instalments into each of a plurality of blending chambers so that each blending chamber receives a plurality of instalments of the mixed ingredients and thereby contains an average sample, then fully discharging the blending chambers in sequence to provide an output in the form of a series of sub-batches each comprising said predetermined proportions of ingredients.

In the application of the above method to the continuous compounding of rubber and other elastomers, or plastics, the sub-batches from the blending chambers are preferably each fully discharged in sequence into the inlet hopper of a continuous mixer/masticator of the kind which incorporates a mixing chamber followed by an extruder and pelletizer, the mixing chamber being sufficiently large to accept the whole sub-batch from each blending chamber and to subject that sub-batch to a mixing/masticating action sufficiently to ensure that any separation of ingredients which may have occured within the sub-batch is overcome.

The invention also provides apparatus for blending particulate materials comprising an assembly of blending chambers and means for transferring mixed ingredients into the blending chambers by a series of instalments so that each blending chamber receives a plurality of instalments of the mixed ingredients and thereby contains an average sample, means being provided for fully discharging the blending chambers to provide an output in the form of a series of sub-batches each comprising said predetermined proportions of ingredients.

In a preferred form, the apparatus comprises a plurality of vertically disposed tubes arranged as an assembly in a frame which is rotatable about a vertical axis, the tubes being disposed in a common pitch circle around the axis of the frame and having open ends adjacent the upper end of the apparatus. A rotating chute is arranged to deliver mixed ingredients continuously to the upper ends of the tubes while a batch of material is being emptied into the tube assembly, the chute rotating around the axis of the frame to ensure that material passes in instalments into each of the tubes in turn, the tubes each having a valve at the lower end so that when a batch of material has been transferred into the tubes the tubes may be brought one at a time to a discharge point by rotation of the frame and the valve can then operate to release the whole contents of the tube.

It has been found that in order to achieve satisfactory emptying of the mixed ingredients from the tubes the tubes should preferably be constructed of flexible material, and the valves may conveniently be in the form of releasable pinch valves comprising means arranged to grip and flatten a portion of each tube to close it.

Figure 2:
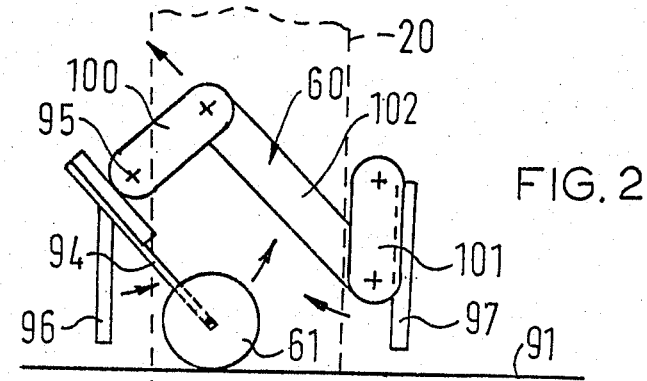
Figure 3:
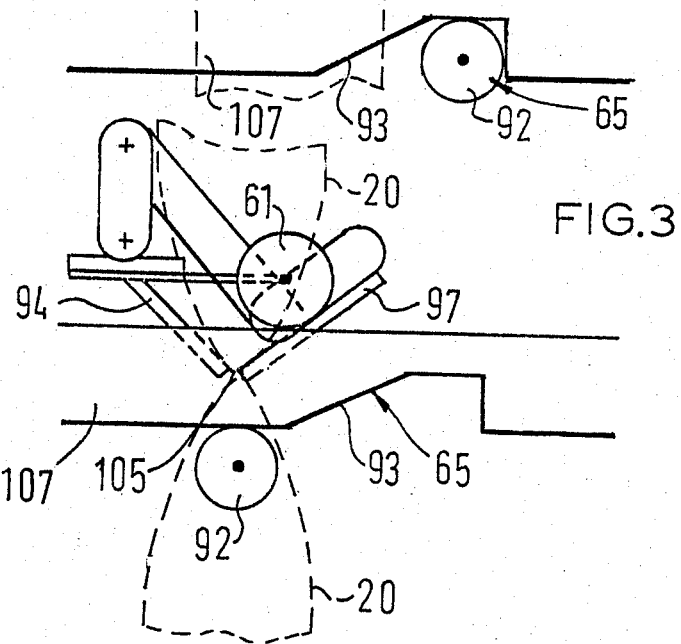

One embodiment of the invention will now be described, by way of example, with reference to the accompanying drawings in which:

FIG. 1 is a diagrammatic perspective view, partly broken away, of blending apparatus in accordance with the invention, FIG. 2 is a detail diagrammatic view from the same direction as FIG. 1 showing an upper valve mechanism in the open state, FIG. 3 is a similar view to that of FIG. 2 showing the closed state of the valve, and FIG. 4 is a detail diagrammatic view from the same direction as FIG. 1 showing lower valve mechanisms.

The blending apparatus 10 shown in the drawing comprises a frame 11 which is rotatably supported on a base 12 about a vertical axis 13.

The frame 11 comprises three coaxial annular discs 15,16,17, which are apertured to provide support for an assembly of forty-eight vertical rubber or plastic flexible tubes 20 having open ends 21 secured in the upper disc 15. A conical cover 24 is secured to the upper disc 15 and carries a central inlet duct 25 for mixed ingredients.

Immediately below the inlet duct 25, a rotatable chute 30 is mounted on a drive unit 31, which is itself drivable by a vertical shaft 32 from a motor at the base of the apparatus (not shown) to rotate the chute 30 at a speed of approximately 15 revolutions per minute so that its discharge end 33 passes in turn over the open ends 21 of the tubes 20 and thus passes over each open end many times during the transfer of a batch of material from a pre-mixer (not shown) into the tubes 20 via the inlet duct 25 and chute 30. By this means each of the tubes 20 constitutes a blending chamber which receives a plurality of instalments of mixed ingredients, and whilst the mixture may vary in composition from the beginning of such a transfer operation to the end of the operation an average sample will be deposited in each tube.

The lower ends 41 of the tubes 20 are each provided with a pinch valve mechanism 42 operated by a roller 43 in association with a suitable cam surface 44 on the base 12 of the apparatus so that each tube may be discharged automatically when the frame 11 is rotated to bring that tube to the discharge position 45.

The lower valve mechanisms 42 are illustrated in more detail in FIG. 4. They are similar in construction and operation to the upper valve mechanisms 60, and common parts are identified by the same reference numerals, but are arranged so that their operating rollers 43 run on a fixed disc 106, holding the lower ends of the tubes 20 in a closed state as shown at 20a and 20c in FIG. 4. As the assembly of tubes is rotated with the support frame, when a tube (as indicated at 20b) reaches a position vertically above the discharge chute 45 its valve is opened by means of the roller 43 which drops into an opening 110 in the disc 106.

By further movement of the frame, the tube is carried into the position shown at 20a, the associated roller 43 riding up the fixed cam surface 44 to operate the closure of the valve mechanism.

The rotation of the frame may be effected by an indexing mechanism 50 comprising a pneumatic piston and cylinder mechanism carrying a pawl 52 engageable with ratchet teeth 53 formed on the lower disc 17.

The intermediate disc 16 carries a series of pinch valve mechanisms 60 each actuated by a roller 61 and arranged so that all of the valves 60 may be opened or closed simultaneously by a cam mechanism 65.

The cam mechanism 65 comprises a rotatable ring surface 91 formed on an angularly movable ring 107 for limited rotation about the vertical axis 13 under the action of a pneumatic actuator (not shown). Fixed rollers 92 engage ramps on the ring so that on rotation of the ring from the position shown in FIG. 2 to the position shown in FIG. 3 the ring 107 is lifted, thus raising all the rollers 61 simultaneously.

The rollers 61 are carried on springy arms 94 rotatable about pivots to control the operation of pinch valve plates 96 which are secured directly to the arms 94 and opposing pinch valve plates 97 which are connected to move in unison with the valve plates 96 by means of levers 100, 101 and a link 102. FIG. 3 shows the positions of the pinch valve plates in the final closed position, the tubes 20 being pinched in the nip 105 between the two plates 94, 97 which extend generally radially relative to the axis 13 so as to engage the whole width of each tube and thus close it when in the positin shown in FIG. 3.

When it is required to open the valves 60, the ring 107 is rotated back to the position shown in FIG. 2 when all the valves open simultaneously.

The apparatus is completely surrounded by cylindrical walls 70, 71, to prevent the escape of dust from the interior of the tubes, and an inner conical dust cover 75, part of which is shown in the drawing extends to the inner edge of the annular disc 15 to seal the inner area of the aparatus from dust, the chute 30 thus operating in a sealed space between the inner cover 75 and the outer cover 24.

In operation, the apparatus described above is first placed in a state in which the valves 42 are all closed and the valves 60 are all open. Mixtures of rubber and compounding ingredients are prepared in batches of 100 kilograms, and five of these 100 kilogram batches are fed into a blender 10, with the chute 33 in continuous rotation. In a typical operation, the feeding of one hundred kilograms into the blender will be carried out in about one minute; during this time the rotating chute will make approximately fifteen revolutions around its axis and each tube will therefore contain approximately 15 instalments of mixed ingredients from each hundred-kilogram batch.

The upper series of valves 60 is then closed so that the tubes 20 are divided into upper portions 80 and lower portions 81, the lower portions 81 being filled and ready for discharge while the upper portions 80 are empty and ready to receive a further five 100 kilogram batches from the associated pre-mixer. Once the lower tubes 81 are completely filled the apparatus is ready to begin to discharge into a continuous rubber mixer/masticator and for this purpose the frame 11 is rotated by the mechanism 50 in a step-by-step movement bringing each lower tube portion 81 in turn adjacent the discharge port 45. At this point the automatic valve mechanism operates to release the contents of the adjacent tube portion 81 into an inlet hopper of the continuous mixer/masticator. By ensuring that the whole of the sub-batch of mixed and blended rubber and compounding ingredients contained in each lower tube portion 81 is delivered at once into the inlet chamber of the mixer/masticator, and provided that the inlet chamber is sufficiently large to accept the whole of this sub-batch (approximately 10 kgs), it is ensured that a properly proportioned sub-batch of rubber and other ingredients is processed through the continuous mixer/masticator.

While the lower tube portions 81 are being discharged, the upper tube portions 80 are being filled, and when all the lower tube portions 81 are empty the lower valves are closed. The valves 60 are then operated to release the contents of the upper tube portions 80 into the corresponding lower tube portions 81 so that the mixing operation may continue substantially without interruption, the valves 60 then being closed again and the filling of the upper tube portions 80 re-commenced.

It has been found that by using thin-walled flexible tubes 20 which are easily deformable (and in a preferred construction are not sufficiently rigid to assume any fixed cross-sectional profile when hanging in the frame), rubber compounding materials contained in the tubes do not tend to adhere to the walls of the tubes to any significant extent but are discharged efficiently when the pinch valves are opened. For convenience of construction, to permit a compact frame assembly to be designed and to facilitate the provision of simple pinch valve mechanisms the tubes 20 are conveniently supported so that they assume an elongated shape in horizontal cross-section, the major axes of the elongated shape being aligned radially relative to the vertical axis 13 of the assembly.

Whilst in the apparatus described above a rotating chute is employed to transfer ingredients by instalments into the tubes 20, other distribution arrangements such as rotating cones or screw feeders can be employed provided that the tubes each receive an average sample in the operation of the transfer process.

In the foregoing description, the application of the invention to the specific problems of rubber compounding has been emphasized, but it should be mentioned that it is also applicable to other industrial blending operations, such as may be encountered in the following industries:

Food (e.g. tea, muesli)
Cement/sand/aggregate
Seeds
Fertilizers
Animal feed

For some of the above applications the advantages of using flexible tubes may not be important and rigid compartments or chambers may be substituted.

We claim:

1. A method of blending particulate materials comprising mixing together predetermined proportions of ingredients to form a batch and transferring the mixed ingredients by a series of instalments into each of a plurality of blending chambers so that each blending chamber receives a plurality of instalments of the mixed ingredients and thereby contains an average sample, then fully discharging the blending chambers in sequence to provide an output in the form of a series of sub-batches each comprising said predetermined proportions of ingredients and the transfer of the batch to the blending chambers being completed before the sequential discharge of the blending chambers commences, whereby the output from the blending chambers is in the form of a series of sub-batches each comprising said predetermined portions of ingredients.

2. A method according to claim 1 as applied to the continuous compounding of rubber and other elastomers, or plastics, wherein the blending chambers are arranged to be each fully discharged in sequence into the mixing chamber of a continuous mixer/masticator, said mixing chamber being sufficiently large to accept the whole sub-batch from each blending chamber and subjecting that sub-batch to a mixing/masticating action sufficiently to ensure that any separation of ingredients which may have occurred within the sub-batch is overcome.

3. Apparatus for blending particulate materials comprising an assembly of blending chambers and means for transferring a batch containing predetermined proportions of mixed ingredients into the blending chambers by a series of instalments so that each blending chamber receives a plurality of instalments of the mixed ingredients and thereby contains an average sample, means being provided to enable the blending chambers to be discharged sequentially only when the transfer of a whole batch of ingredients into the blending chambers is completed, for fully discharging the blending chambers to provide an output in the form of a series of sub-batches each comprising said predetermined proportions of ingredients.

4. Apparatus according to claim 3 wherein the blending chambers comprise a purlity of vertically disposed tubes having open upper ends and valves at their lower ends.

5. Apparatus according to claim 4 wherein the tubes are of flexible material and the valves are in the form of releasable pinch valves comprising means arranged to grip and flatten a portion of each tube to close it.

6. Apparatus according to claim 3 wherein the tubes are arranged in a frame which is rotatable about a vertical axis to bring each tube in turn to a discharge point, and wherein a chute is provided to feed ingredients to the upper ends of the tubes, the chute being rotatable about the frame axis to feed ingredients by a series of instalments into each of the tubes.

7. Apparatus according to claim 6 wherein the lower valve for each tube is operable via a cam mechanism which acts to open the lower valve when the tube is at the discharge point.

8. Apparatus for blending particulate materials comprising an assembly of blending chambers and means for transferring mixed ingredients into the blending chambers by a series of instalments so that each blending chamber receives a plurality of instalments of the mixed ingredients and thereby contains an average sample, means being provided for fully discharging the blending chambers to provide an output in the form of a series of sub-batches each comprising said predetermined proportions of ingredients and each tube comprising a plurality of valves in vertically spaced positions, the upper portions of the tubes constituting the said blending chambers arranged to receive a plurality of instalments of mixed ingredients and the lower portions of the tubes constituting either blending chambers or transfer chambers for sub-batches of ingredients discharged from the upper blending chambers, an upper valve being arranged to control the discharge of a sub-batch of ingredients from the upper blending chamber to a lower transfer chamber of each tube and a lower valve being arranged to control the discharge of a sub-batch of ingredients from the lower blending or transfer chamber.

9. Apparatus according to claim 8 wherein the upper valve for each tube is operable via a cam mechanism which acts on all the upper valves simultaneously.

10. Apparatus according to claim 9 wherein the cam mechanism comprises a ring which is movable vertically to rotate levers attached one to each of the upper valves.

11. Apparatus according to claim 10 wherein the upper valves each comprise a pair of opposed pinch valve plates rotatable by said levers.

* * * * *